No. 713,298. Patented Nov. 11, 1902.
W. F. M. GOSS.
PROCESS OF DISTILLING LIQUIDS.
(Application filed Nov. 11, 1901.)
(No Model.)
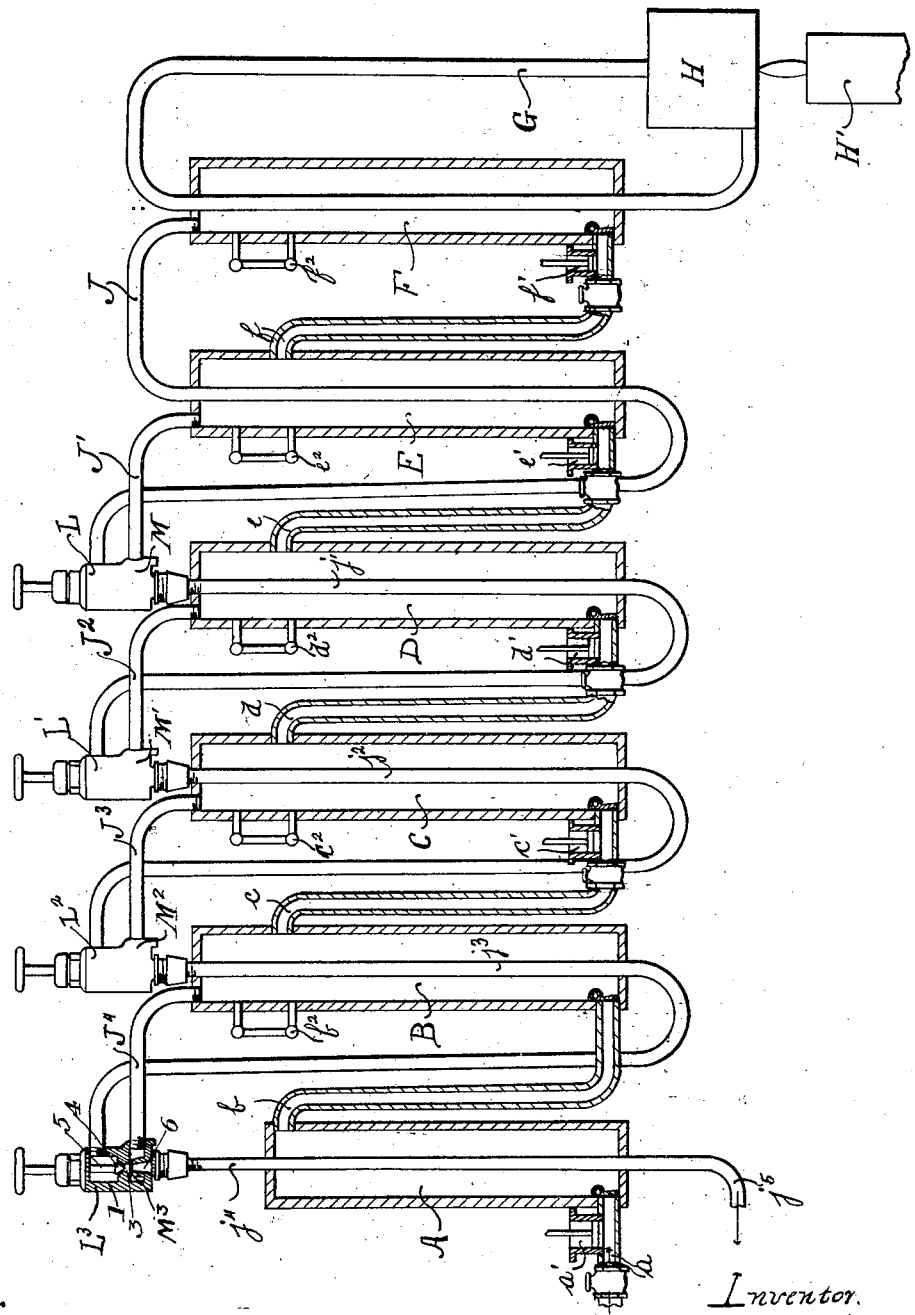
Witnesses:
Herbert F. Obergfell.
May W. Label.
Inventor.
William F. M. Goss,
By Charles A. Brown Cragg Belfield
Attorneys.

United States Patent Office.

WILLIAM F. M. GOSS, OF LAFAYETTE, INDIANA, ASSIGNOR TO UNITED STATES DISTILLATION COMPANY, OF INDIANAPOLIS, INDIANA, A CORPORATION OF INDIANA.

PROCESS OF DISTILLING LIQUIDS.

SPECIFICATION forming part of Letters Patent No. 713,298, dated November 11, 1902.

Application filed November 11, 1901. Serial No. 31,892. (No specimens.)

*To all whom it may concern:*

Be it known that I, WILLIAM F. M. GOSS, a citizen of the United States, residing at Lafayette, in the county of Tippecanoe and State of Indiana, have invented a certain new and useful Improvement in Processes of Distilling Liquids, (Case No. 2,) of which the following is a full, clear, concise, and exact description, reference being had to the accompanying drawing, forming a part of this specification.

My invention relates to the distillation of liquids by first evaporating them and then condensing the vapors and also to allied arts, such as the concentration of solutions containing salts, sugars, and the like, by evaporation.

In an application filed by me March 12, 1900, Serial No. 8,320, for a distilling apparatus I have shown and described a novel apparatus for distilling, concentrating, and similarly treating liquids and have set forth therein the novel process carried on by the operation of that apparatus. In that application I have claimed the apparatus, but not the process carried on thereby.

In the present application I intend to claim the process as carried on by the apparatus of my said other application.

In the present application I will show and describe an apparatus substantially the same as that shown and described in my said other application, as such apparatus is exceedingly simple and easily understood and constitutes what may be considered an elementary embodiment of the type of apparatus now best known to me for carrying on my new process of distillation.

In the present application I shall claim the process as carried on by such apparatus, although it will be fully understood that I do not desire to limit myself to the apparatus shown and described or even to that type of apparatus, as it is evident that my novel process can be carried out by other means.

In the drawing the figure is an illustration, partly in section and partly in elevation, of the above-referred-to apparatus by which I am enabled to carry on my novel process of distillation.

The apparatus shown consists of a series of chambers A, B, C, D, E, and F, which can be simple cylinders adapted to contain the liquid to be distilled or otherwise treated.

The chamber A is provided with an inlet-pipe $a$, connected to the lower end thereof, and this inlet-pipe is provided with a pump $a'$. A circulation-pipe $b$ is extended between the upper end of the cylinder A and the lower end of the cylinder B. In a generally similar way circulation-pipes $c$, $d$, $e$, and $f$ extend between the succeeding chambers, the pipe $c^2$ being connected with the chamber B near the top thereof and also with the chamber C at the bottom thereof, the pipe $d$ being connected with the chamber C near its top and with the chamber D at the bottom thereof, and so on throughout the series. The circulation-pipes $c$, $d$, $e$, and $f$ are provided with pumps $c'$, $d'$, $e'$, and $f'$, respectively. These pumps, together with the pump $a'$, are adapted to cause the liquid to pass from chamber to chamber, and thus induce a continuous and steady forward circulation of the liquid to be treated. The pump $a'$ is adapted to deliver the greatest amount of liquid, the pump $c'$ the next greatest, the pump $d'$ the next, and the pumps $e'$ and $f'$ successively less, the latter thus being adapted to deliver the smallest amount. As an arrangement for securing this difference in delivery of the pumps they can be made of different sizes, the pump $a'$ the largest and the others successively smaller, as shown in the drawing. It is perfectly obvious, though, that to secure this result they could all be of the same size and could be run at different speeds, and also that other arrangements could be devised. It is also obvious that a steady forward circulation of the liquid from chamber to chamber could be brought about in other ways than by the use of pumps—as, for example, by arranging these different chambers at successively lower levels. The chambers B, C, D, E, and F are provided with gages $b^2$, $c^2$, $d^2$, $e^2$, and $f^2$, respectively, adapted to indicate the height of liquid in such chambers.

The endmost chamber F is provided with means for heating its contents, for which purpose any suitable device or arrangement could of course be employed. The arrangement shown consists of a steam-pipe G, extending from the boiler H into and through the said chamber and returning to the boiler, so as to form a complete circuit for the steam. The boiler H is shown provided with a heating device, (shown diagrammatically at H'.) A pipe J extends from the top of the endmost chamber F into and through the next preceding chamber E, and thence upwardly to a point above the chamber D, where it is connected with a pressure-reducing valve L. A pipe J' extends from the top of the chamber E across to a point above the next preceding chamber D, where it is connected with a mixing-chamber M, this mixing-chamber M being made in a single fitting with the pressure-reducing valve L. A pipe j' is connected with the lower end of the mixing-chamber M and extends downwardly into and through the chamber D and thence upwardly to a point above the next preceding chamber C, where it is connected with a pressure-reducing valve L'. A pipe J² extends from the top of the chamber D across to a point above the next preceding chamber C, where it is connected with a mixing-chamber M', which, as in the former instance, is conveniently made integral with the pressure-reducing valve L'. In a similar way a pipe j² extends downwardly from the mixing-chamber M' into and through the chamber C, and thence upwardly to a pressure-reducing valve L² above the chamber B, and a pipe J³ extends across from the top of the chamber C to a mixing-chamber M² above the chamber B, and also a pipe j³ extends downwardly from the mixing-chamber M² into and through the chamber B, and thence upwardly to a pressure-reducing valve L³ above the first chamber A, and a pipe J⁴ extends across from the top of the chamber B to a mixing-chamber M³ above the first chamber A. From this mixing-chamber M³ a pipe j⁴ extends downwardly into and through the first chamber A, and its lower end terminates as an outlet j⁵. The pressure-reducing valves L L', &c., and the mixing-chambers M M', &c., can be of any suitable or desired construction, and they can be made separately, each by itself, or a combined pressure-reducing valve and a mixing-chamber in a single fitting, as shown in the drawing. The single fittings shown in the drawing are illustrated merely for the purpose of showing an operative apparatus and are alike for the several chambers. A description of one of them, the fitting embodying the combined valve L³ and chambers M³, for instance, will suffice for all. This fitting comprises a casting 1, having a transverse partition 2, provided with a port 3. The port 3 is controlled by a valve 4 on a valve-stem 5, which latter extends upwardly out of the upper end of the fitting. The fitting is also provided with an upwardly-extending nozzle 6, having its upper end close to the partition 2. The pipe j⁵ is connected with the upper end portion of the fitting and the pipe J⁴ with the lower portion thereof. The passage of matter from the pipe j³ through the partially-closed port 3 results in wire-drawing, and this wire-drawing reduces the pressure of such matter, whereby the upper part of the fitting forms a pressure-reducing valve. Matter coming from the pipe J⁴ passes into the nozzle 6 and there becomes mixed with matter coming through the port 3, whereby the lower part of the fitting forms a mixing-valve. The valve-stem 5, being screw-threaded and rotatable by the valve-handle, permits the adjustment of the valve 4 relatively to its valve-seat, and thereby permits the extent of pressure reduction occurring in each pressure-reducing valve to be varied as desired.

The process carried on by the apparatus as above set forth will be as follows: The liquid to be treated is continually introduced into the bottom of the first chamber A through the inlet-pipe $a$. From this chamber a continuous circulation occurs to the chamber B by way of the pipe $b$, thence to the chamber C by way of the pipe $c$, and thence to each of the succeeding chambers in succession. The liquid in the endmost chamber F, by reason of the heat continually applied to that chamber, undergoes continuous evaporation. The vapors thus produced will issue into the pipe J, through which they will circulate. In passing downwardly through the portion of the pipe J, confined within the chamber E, the vapors will become condensed by the liquid confined in such chamber. The condensate thus formed will pass upwardly through the remaining portion of the pipe J and into the pressure-reducing valve L. From this valve the condensate will pass into the pipe j', and in so doing will have its pressure reduced to an extent dependent, of course, upon the construction or adjustment of the valve L. The condensate will then circulate through this pipe j' and into the pressure-reducing valve L', where its pressure will be again reduced. After this it will circulate in succession through the pipes j², j³, and j⁴ and out of the discharge-outlet j⁵, during which passage it will have its pressure reduced by the valves L² and L³. The circulation of the vapors from the chamber F through the pipe J and the condensation of the same in such pipe serves to heat the liquid in the chamber E, as a result of which evaporation occurs from the liquid in this chamber also. Vapors produced by this evaporation issue into the pipe J', through which they pass to the mixing-valve M, where they are mixed with the condensate coming from the pressure-reducing valve L. As thus mixed with this condensate the vapors pass with the same into the pipe j', and during their downward passage in this pipe they become condensed. The condensate thus formed circulates through the remaining portion of the pipe J' with the other condensate and has its pressure reduced by the valve L', as the condensate previously referred to does. Thence it circulates in succession through the pipes j², $j^3$, and $j^4$ and out of the outlet $j^5$, having its pressure reduced at $L^2$ and $L^3$, as in the case of the other condensate. The circulation of the mixture of vapors from the chamber E and of the condensate from the chamber F in the pipe $j'$ and the condensation of these vapors in that pipe have the effect of heating the contents of the chamber D and of causing evaporation from the same. The vapors thus produced pass into the pipe $J^2$ to the mixing-chamber M', where they mix with the combined condensate coming from the pressure-reducing valve L'. The mixture passes from the mixing-chamber M' to the pipe $j^2$, in which it circulates, to the pressure-reducing valve $L^2$, during which circulation the vapors are condensed. The new condensate circulates with the other condensate through the pressure-reducing valve $L^2$, the mixing-chamber $M^2$, the pipe $j^3$, the valve $L^3$, chamber $M^3$, and the pipe $j^4$, and thence out of the outlet $j^5$, having its pressure likewise reduced at $L^2$ and $L^3$. In a similar way the mixture circulating in the pipe $j^2$ and the condensation of the vapors of said mixture therein heats the liquid in chamber C and causes evaporation thereof. The vapors thus produced pass into the mixing-chamber $M^2$ by way of the pipe $J^3$, where they mix with the condensate coming from the pressure-reducing valve $L^2$, after which the mixture circulates through the pipe $j^3$, where its vapors are condensed. This new condensate passes along through the remainder of the apparatus with the condensate already circulating in said pipe $j^3$. The contents of the chamber B are similarly heated and evaporated, and the vapors therefrom mixed with the condensate from the succeeding chambers at $M^3$ and condensed in the pipe $j^4$, whence they issue with the other condensate. The contents of the chamber A are heated by the circulation of the mixture in the pipe $j^4$ and the condensation of the vapors of said mixture therein.

It will be understood, of course, that the process is continuous and uniform. The liquid to be distilled is fed continuously to the first chamber A and circulates continuously through it to and through the other chambers B, C, D, and E and into F. The evaporation of the liquid occurs simultaneously in all of the chambers except in the first, and the vapors issue in a steady stream into the respective vapor-pipes and are continuously condensed in the immediately-preceding chambers, and the condensate from the various chambers collects in the return-duct formed by the pipes and is discharged in a steady stream through the outlet $j^5$. Thus there is brought about a continuous forward flow of the liquid to be distilled and a continuous evaporation of the same, while at the same time there is a continuous condensation of the vapors from such evaporation and a continuous return-flow of the condensate.

It is obvious that since the pressure-reducing valve L causes the pressure in the pipe $j'$ to be lower than that of the pipe J the temperature of the former is lower than that of the latter, and consequently the pipe $j'$ will not heat the liquid in the chamber D to as high a temperature as that to which the liquid in the chamber E is heated. The temperature of the liquid in the chamber D will therefore at all times be lower than that of the liquid in the chamber C and its pressure less. For similar reasons the temperature and pressure of the liquid in the chamber C will be lower than in D, those of B lower than in C, and of A lower than in B. As a result, the ingoing stream of liquid to be distilled has its pressure raised repeatedly in passing from chamber to chamber, and the outcoming or return stream of distillate has its pressure and temperature reduced as it returns from chamber to chamber.

In the practice of the invention as carried out by the apparatus herein shown and described the temperature and pressure of the different chambers are regulated by adjusting the pressure-reducing valves L, L', $L^2$, and $L^3$ to cause a greater or less reduction of pressure. I find in order to bring about a satisfactory working of the apparatus that it is desirable to have the total range of temperature to which the apparatus is subjected divided by equal steps between the several chambers. For example, assume that the apparatus as shown diagrammatically herewith is designed to distil water and assume an initial pressure in boiler H of one hundred and fifty pounds above the pressure of the atmosphere and a temperature of discharge from the pipe J of 212° Fahrenheit. The temperature in the boiler H corresponding to the pressure of one hundred and fifty pounds will be 366° Fahrenheit, and the total range of temperature to which the apparatus will be subjected under the assumption named is the difference between 366° and 212°, or 154°. The apparatus shown contains six chambers, and there are six steps in the course of which heat is transferred. These are, first, from the steam in G to the steam and water in F; second, from the steam in J to the steam and water in E; third, from the mixture of steam and water in $j'$ to the steam and water in D; fourth, from the mixture of steam and water in $j^2$ to the steam and water in C; fifth, from the mixture of steam and water in $j^3$ to the steam and water in B; sixth, from the mixture of steam and water in $j^4$ to the water in A. The steps in temperature to be equal in the particular case under consideration require that each should amount to approximately 26°. By means of the principle thus defined it is always possible when the highest and lowest pressures are known to determine what should be the temperature of each of the several chambers. Knowing the temperature of the chamber, the pressure to be carried upon it is readily determined for any material the physical properties of which are understood. It is admitted that the principle stated is subject to some limitation. The ability to adhere strictly to it depends somewhat upon the number of chambers, the temperature of the feed, and the range of temperature to which the whole apparatus is subjected. Its application is, however, sufficiently general to allow the determination of the pressure to be carried upon the several chambers of any apparatus with sufficient accuracy to satisfy the requirements of practice. For the distillation of water I also find that it is desirable to employ at least seven chambers in order to have the condensate issuing from the apparatus entirely liquid. If less than seven chambers are employed, the condensate is a mixture of vapor and liquid. In general the number of chambers may be regarded as determining the efficiency of the whole apparatus. With a given amount of heat available more liquid will be distilled when a considerable number of chambers are employed than when a few only are available. It is desirable in the practice of the invention to cause the temperature of the liquid issuing from the apparatus to approach as closely as possible to the temperature of the liquid supplied the same. Other things being equal, the nearer its approach the higher will be the efficiency.

It is obvious that the number of chambers can be varied at will. If but few are employed, the stream delivered from the apparatus may be a mixture of liquid and vapor, or if entirely liquid it may be at a temperature sufficiently high to cause a portion of it to vaporize as it emerges from the apparatus. As the number of chambers is increased the proportion of the whole output which is liquid increases until when a sufficient number becomes available the total stream delivered will be liquid. A still further increase in the number of chambers will result in a lowering of the temperature of the delivered stream, causing it to approach more closely the temperature of the ingoing stream.

The capacity of the apparatus under any assumed range of temperature depends upon the amount of transmitting-surface contained by each chamber. The capacity is not materially affected by increasing the number of chambers. Again, assuming the apparatus to be fixed in its dimensions the capacity depends upon the range of temperature to which it is subjected. This being true, it is desirable that the pressure, and consequently the temperature at which heat is supplied the apparatus, be as high as possible; also, that the pressure of delivery be as low as possible.

Referring now to the distinctive features of my invention, it will be seen that the liquid in each chamber is evaporated and that the vapors thus produced are carried backward and condensed by the liquid in the preceding chambers, and also that the condensate thus produced is carried continuously backward through the preceding chambers, where it serves to heat the contents of those chambers. Thus by the invention there is brought about a continuous evaporation of the liquid, a condensation of those vapors by the liquid, and a heating of the liquid by the condensate. In this way since there is no discharge or escape of vapors and but a single discharge of condensate there is no loss by the process except such as occurs from unavoidable radiation and from the single discharge of condensate. It is therefore apparent that the process permits this loss to be reduced as much as possible by reducing the extent of unavoidable radiation and by causing the temperature of the discharge to approach as closely as possible to the temperature of the supply. With the reduction of this loss to a minimum the efficiency of the apparatus of course is increased to a maximum.

It will be understood, of course, as pointed out at the beginning of this specification, that the process can be carried out by forms of apparatus differing from that herein shown, and that I do not, therefore, desire to confine myself in the claims for this process to the use of the present apparatus.

In general it may be said that the form of the apparatus should be such as will present a desired amount of transmitting-surface within reasonable limits of space and which will provide for a disposition of the transmitting-surface such as will permit all parts of the apparatus to be readily freed from accumulations of precipitate.

In the preceding descriptions the liquid to be evaporated is described as feeding in a continual stream from one chamber to another, each chamber reserving for itself so much as it may be able to vaporize and allowing the remainder to be moved on to the next succeeding chamber. The water entering each chamber mingles freely with the water of that chamber from which it receives heat. It is not essential to the theoretical working of the apparatus that this process be strictly adhered to, the requirement being merely that such chamber shall heat the water which is to be fed to the next succeeding chamber to a temperature approximately equal that of its own liquid prior to sending it on. It is obvious that this can be secured in various other ways.

What I claim as my invention is—

1. The process of distilling liquids, which consists in evaporating a portion of the liquid, condensing the vapors so produced by another portion of the liquid, employing the condensate for evaporating still another portion thereof, inducing a flow of the liquid toward the portion first evaporated, and inducing a flow of the condensate in the opposite direction.

2. The process of distilling liquids, which consists in separating the liquid into different portions, causing evaporation from each portion, condensing the vapors from each portion by the preceding portion, employing the condensates from the different portions for evaporating the respectively preceding portions, and inducing flows of the liquid and condensate from portion to portion in opposite directions.

3. The process of distilling liquids, which consists in dividing the liquid into portions, inducing a forward circulation of the liquid from one portion to another in succession, causing evaporation from the endmost portion, condensing the vapors therefrom by the next preceding portion and thereby heating such portion to an extent to cause evaporation, employing the condensate for evaporating the preceding portions, condensing the vapors from each portion by the next preceding portion, combining all of the condensates with the condensate of the first portion, so that each condensate acts to evaporate the portion or portions preceding that by which it was condensed, inducing a return flow of the condensate in a direction opposite the direction of flow of the liquid, and reducing the pressure of the combined condensate at each portion, substantially as described.

4. The process of distilling liquids, which consists in dividing the liquid into different portions, causing evaporation from one of such portions, causing a forward circulation of the liquid from portion to portion toward said portion from which evaporation is caused, employing the vapors caused by the evaporation from said portion for heating and evaporating the next preceding portion and employing the condensate therefrom for heating and evaporating portions preceding that at which evaporation is caused by the vapors, employing the vapors from the other portions for heating and evaporating the respectively preceding portions and employing the condensates therefrom for heating and evaporating the portions respectively preceding those where evaporation is caused by the vapors, maintaining the different portions under different temperatures and pressures, whereby the first-mentioned portion at which evaporation is originally caused becomes the hottest portion and the others successively cooler ones, and inducing a flow of the condensate from portion to portion in a direction from the hottest to the coldest, substantially as set forth.

5. The process of distilling liquids, which consists in inducing a continuous forward flow of the liquid to be treated, applying external heat to a portion thereof so as to cause evaporation therefrom, employing the vapors resulting from such evaporation for evaporating another portion of the liquid and employing the condensate resulting from the condensation of such vapors for evaporating still another portion of the liquid, and inducing a flow of the vapors and condensate in a direction opposite to the forward flow of the liquid, substantially as set forth.

6. The process of distilling liquids, which consists in inducing a continuous forward flow of the liquid to be distilled, heating a portion of the same so as to cause evaporation, employing the vapors from such evaporation for heating and evaporating an advance portion of the liquid, employing the condensate of such vapors for heating and evaporating still more advanced portions of the liquid, employing the vapors from the portions in advance of the first-mentioned one for heating and evaporating the respectively preceding portions and employing the condensates therefrom for heating and evaporating the respectively second preceding portions, collecting the vapors and condensates in a single stream, and inducing a flow of the same from portion to portion in a direction opposite to the direction of flow of the liquid, substantially as set forth.

7. The process of distilling liquids, which consists in dividing the liquid into portions, inducing a continuous forward flow of the same from one portion to another in succession, heating the endmost portion to an extent to cause evaporation, inducing a return flow of the vapors resulting from such evaporation, so that they act to heat and evaporate the preceding portions and are condensed thereby, joining the vapors from each of said portions with the return stream from the first-mentioned portion, and reducing the pressure of the combined return-stream at each portion, substantially as described.

8. The process of distilling liquids, which consists in maintaining the liquid in a series of vessels, forcing liquid into the first vessel of the series and inducing a flow from it to the other vessels in succession, heating the endmost vessel to cause evaporation, leading the vapors from such endmost vessel to the next preceding vessel and then the condensate and vapors to the other preceding vessels in succession so that the vapors and condensate act to heat and evaporate the contents of all of such vessels preceding the end one, leading the vapors from the other vessels of the series to the respectively preceding ones and then leading the mixture of vapors and condensate to the other preceding vessels in succession so that all of such vapors and condensates act to heat and evaporate the contents of the vessels to which they are respectively led, uniting the vapors and condensates from all of the vessels to form a single stream, maintaining the pressures in the different vessels successively lower than in the endmost one, whereby the latter becomes the hottest and the others successively cooler, and inducing a flow of the stream formed by the united vapors and condensates from vessel to vessel in a direction from the hottest to the coolest, substantially as described.

In witness whereof I hereunto subscribe my name this 1st day of November, A. D. 1901.

WILLIAM F. M. GOSS.

Witnesses:
A. MILLER BELFIELD,
GEORGE L. CRAGG.